United States Patent [19]

Gunkel et al.

[11] Patent Number: 4,629,380
[45] Date of Patent: Dec. 16, 1986

[54] BLIND SETTING RIVET

[75] Inventors: Ronald W. Gunkel, Lower Burrell; James R. Morran, Apollo, both of Pa.

[73] Assignee: Aluminum Company of America, Pittsburgh, Pa.

[21] Appl. No.: 817,974

[22] Filed: Jan. 13, 1986

[51] Int. Cl.[4] .......................... F16B 13/06; F16B 13/04
[52] U.S. Cl. ......................................................... 411/29
[58] Field of Search .......................... 411/29, 30, 31, 32

[56] References Cited

U.S. PATENT DOCUMENTS

| 3,477,336 | 11/1969 | Thorpe | 411/29 |
| 3,487,745 | 1/1970 | Brunelle | 411/29 |
| 3,750,518 | 8/1973 | Rayburn | 85/68 |
| 3,772,957 | 11/1973 | Newton | 85/68 |
| 3,935,786 | 2/1976 | Murray et al. | 85/68 |
| 4,218,953 | 8/1980 | Haytayan | 411/29 |
| 4,293,258 | 10/1981 | McKewan | 13/6 |

FOREIGN PATENT DOCUMENTS

| 1460727 | 1/1977 | United Kingdom | 411/31 |
| 1484260 | 9/1977 | United Kingdom | 15/36 |

Primary Examiner—Alfred C. Perham
Attorney, Agent, or Firm—Max L. Williamson; J. Stewart Brams

[57] ABSTRACT

A preferably aluminum blind setting rivet including a detachable drill tip, preferably of steel, for self-drilling, the drill tip being attached to the rivet mandrel for drilling a hole to receive the rivet and being subsequently ejected from the mandrel during rivet setting.

7 Claims, 3 Drawing Figures

BLIND SETTING RIVET

BACKGROUND OF THE INVENTION

Rivets of aluminum or the like are well known in the fastening arts and are widely used for securing together overlapping, relatively thin section structural members such as sheet metal. For example, in the aircraft industry it is a well known and accepted practice to use aluminum rivets to secure the skin of an aircraft to the airframe. Such rivets offer a high strength to weight ratio and therefore provide sufficient strength for the purpose with mimimum weight contribution to the aircraft.

For this and numerous other applications the rivet type most commonly utilized is referred to as a blind setting rivet as the rivet is installed entirely from the front side of the joint (i.e. the side from which the rivet is inserted before setting), without any need for access to the opposite side of the joint as is required for the installation of hot rivets in structural steel work, for example. Perhaps the most common type of blind rivet is the so-called "pop rivet" which is widely available as a consumer product.

Typically a blind rivet is formed as a hollow elongated sleeve of aluminum having an enlarged head with an axial through bore aligned with the hollow interior of the sleeve. The rivet is provided with a sacrificial rivet setting device that includes a mandrel positioned adjacent the end of the rivet sleeve opposite the head and an elongated shank which extends from the mandrel through the hollow interior of the rivet sleeve and outwardly of the head. As is well known, for installation such a rivet is positioned in a predrilled hole in the materials to be joined and tension is applied to the mandrel shank to pull the mandrel toward the rivet head and thereby deform that portion of the rivet sleeve which protrudes through the hole in which the rivet is to be set. As a result the protruding portion of the rivet sleeve is upset, radially expanded, or otherwise deformed to set the rivet. A breakoff section of the mandrel shank, such as a reduced diameter section for example, fractures with the application of further tension and/or bending after the rivet is fully set, thus freeing the mandrel and the shank from the rivet and leaving only the set rivet in place. This provides a strong permanent fastener of minimum weight.

The concept of self-drilling blind rivets is well known but the co-inventors herein are not aware of any which have been commercially successful; the major reason is excessive cost. The self-drilling rivet in its various forms is intended to simplify and speed up rivet installation by providing a drilling tip on the rivet structure whereby the hole to receive the rivet may be drilled, and the rivet then inserted and set as above described in a continuous operation with a single tool.

Previous self-drilling rivet concepts typically have included a tip portion of the sleeve opposite the rivet head, or a protruding portion of the rivet setting mandrel, which is formed as a drill bit for drilling the required hole. Examples of prior art self-drilling blind rivets include the following: U.S. Pat. Nos. 3,935,786; 3,772,957; and 3,750,518, all disclosing self-drilling rivets wherein the drill bit is formed as the forwardmost end of the rivet setting mandrel. U.S. Pat. No. 4,293,258 discloses a self-drilling blind rivet wherein the drill bit is a formed end of the rivet sleeve. British Patent Specification No. 1,484,260 discloses another self-drilling blind rivet.

Prior art self-drilling rivets generally have been subject to certain shortcomings. For example, the production of a one-use only drill bit on the tip of a rivet mandrel or rivet sleeve adds to the cost of the rivet and this incremental cost element reduces the cost benefit available from the attendent productivity improvements. Furthermore, to be effective for drilling the rivet hole, the drilling tip preferably is to be made of harder material than the rivet itself. The rivet must be readily deformable in setting thereof without deformation of the material surrounding the hole in which it is set, but the drill tip must be hard enough to readily drill the hole through the same material. In design practice, this problem typically imposes a weight and/or cost penalty. For example, in applications where the drilling tip remains as part of the installed rivet in the finished structure after rivet setting, the added weight of a steel drill tip would be undesirable; additionally, the aluminum-to-steel contact could cause long-term corrosion problems. If the drill tip is instead a lighter (i.e. lower density) material, a cost penalty typically arises.

BRIEF SUMMARY OF THE INVENTION

The present invention contemplates a blind, self-drilling rivet having a detachable drilling cap which is carried by the rivet mandrel for drilling the rivet hole, and which is ejected from the mandrel during rivet setting so that the drilling cap does not unnecessarily increase the weight of the finished rivet joint. In addition, the invention avoids potential long term corrosion problems that could well arise if the drilling cap were permanently retained by the aluminum rivet and were of a material better suited for a drill, tool steel for example.

Briefly, the invention in one presently preferred embodiment thereof pertains to a novel blind, self-drilling rivet having a head and a hollow sleeve with a mandrel located axially outward of the sleeve end opposite the rivet head and a shank extending from the mandrel through the hollow sleeve and rivet head. The mandrel is formed to receive a novel detachable drilling cap for rotary driving thereof through rotation of the shank and mandrel.

Accordingly, it is one general object of the invention to provide a new and improved self-drilling blind rivet.

A more specific object of the invention is to provide a self-drilling blind rivet with a drilling tip that is separated from the rivet mandrel during rivet setting.

These and other objects and further advantages of the invention will be more readily understood upon consideration of the following detailed description and the accompanying drawings, in which.

Figure 1:
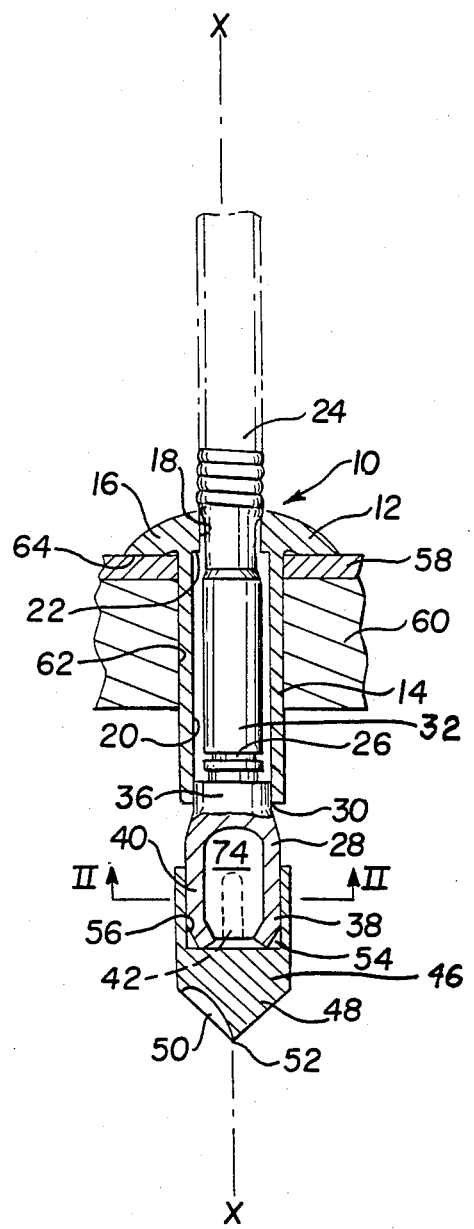
FIG. 1 is a sectioned side elevation of a self-drilling blind rivet of the instant invention.

There is generally indicated at 10 in FIG. 1 a self-drilling blind rivet according to one presently preferred embodiment of the instant invention. Rivet 10 includes a rivet member 12 of aluminum or the like which is comprised of an elongated cylindrical hollow sleeve portion 14 having a radially enlarged head portion 16 integral therewith adjacent one end of the sleeve 14. An axial through bore 18 in head 16 is coaxially arranged with respect to the interior periphery 20 of sleeve 14 to define a continuous axial through passage.

Rivet 10 also includes an elongated setting member comprised of an elongated shank 24 which is received within bore 18 and the sleeve interior periphery 20, and a forming mandrel portion 28 which is located coaxially adjacent the forwardmost end of shank 24 so as to project out of the open end 30 of the rivet sleeve 14. Shank portion 24 includes an axially elongated breakoff portion 32 extending adjacent mandrel 28 and including a circumferential score or notch 26 which is designed to localize shank deformation occurring in the process of shank breakoff. Breakoff portion 32 is of a diameter for a close sliding fit within bore 18.

Figure 2:
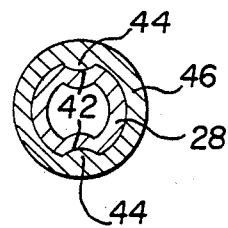
FIG. 2 is a transverse section taken on line II—II of FIG. 1.

Mandrel portion 28 includes axial end portions 36, 38, the end portion 36 being of a diameter for close sliding fit within the interior periphery 20 of sleeve 14. Intermediate the mandrel end portions 36, 38 is an axially extending enlarged diameter portion 40 which serves to deform sleeve 14 when pulled into the interior periphery 20 thereof when rivet 10 is being set. The enlarged diameter portion 40 also receives a drilling cap 46, and to provide rotary driving torque to the drilling cap 46 a plurality of axially extending grooves 42 (FIG. 2) are formed on the outer periphery of mandrel 28 and extend as shown from the forwardmost end thereof to receive complementary axially elongated ridges 44 which are formed on the inner periphery of drilling cap 46. Thus, drilling cap 46 includes an axially elongated body member 48 having drilling flutes 50 and a conical point 52 formed adjacent one end thereof, and an open ended generally cylindrical recess 54 extending therewithin from the opposite ends thereof and within which the ridges 44 are formed. The cylindrical interior periphery 56 of recess 54 is of a diameter for a slight interference fit with the maximum enlarged diameter portion 40 of mandrel 28 for firm retention of the drilling cap 46 thereon when mandrel 28 is received within recess 54. Furthermore, the ridges 44 are formed so as to register with grooves 42 on mandrel 28 for the transmission of rotary drilling torque from setting member 24 to drilling cap 46, as noted.

Installation and setting of rivet 10 is performed as follows. The rivet 10 is utilized like any other blind rivet, to join two overlapping members 58, 60. Accordingly, with a suitable installation tool (not shown) the rivet assembly with drilling cap is axially rotated to impart rotation to drilling cap 46 and thereby drill a receiving hole 62 in members 58, 60. The drilling cap 46 is of a diameter to produce a hole 62 into which rivet sleeve 14 may be inserted without mechanical interference. The rivet 10 is thus inserted into hole 62 with the underside 64 of head 16 flush with the exposed surface of member 58. The installation tool (not shown) is then utilized to hold rivet 12 in place while tension is applied to setting member 24 to draw mandrel 28 into the open end of sleeve 14.

Figure 3:
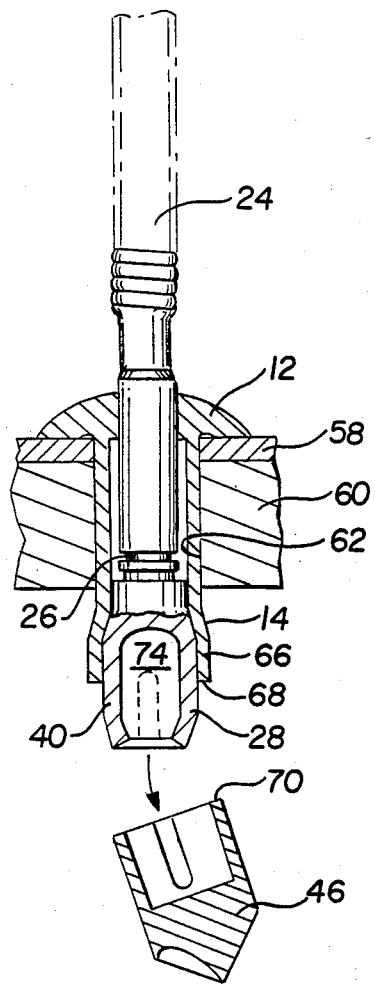
FIG. 3 is a sectioned side elevation similar to FIG. 1 showing the rivet in an initial stage of installation.

In response, the enlarged diameter portion 40 of mandrel 28 expands sleeve 14 radially as shown at 66 in FIG. 3 and continues to move into sleeve 14 until the lower end 68 of sleeve 14 overrides mandrel 28 sufficiently to contact the upper end 70 of drilling cap 46. Thus, upon further movement of mandrel 28 into sleeve 14, the interference between the adjacent ends of sleeve 14 and drilling cap 46 causes drilling cap to be ejected from mandrel 28 and fall free. The weight of drilling cap 46 thus is removed from the riveted joint and the drilling cap 46 may conceivably be reused at substantial cost savings over the alternative of sacrificial one use drills. Furthermore, the possibility is introduced that a drill bit of much more suitable mechanical properties for drilling may be utilized without incurring weight cost penalties. For example, drilling cap 46 may be of tool steel or more exotic materials (e.g. tungsten carbide). Of course this would be uneconomical for a sacrifical drill bit and unfeasable due to corrosion problems (for steel, if the drill bit were to remain as part of the riveted joint in contact with aluminum).

Upon completion of the rivet setting as described, the shank 24 fractures at notch 26 as with conventional rivets. Of course, the configuration of the breakoff section (i.e. section shape and/or cross-sectional area) may be of any conventional form, consistent with the shank strength requirements of the rivet for the described rivet setting procedure.

According to the above description, the invention herein provides a novel and improved self-drilling blind rivet offering enhanced economics and productivity, and improved strength, weight, corrosion and mechanical integrity properties.

Of course, various alternative and modified embodiments have been contemplated by the inventors hereof and such would also readily occur to those versed in the art, after having been apprised of the invention. Accordingly, it is intended that the invention be construed broadly and limited only by the scope of the claims appended hereto.

We claim:

1. In a blind setting rivet assembly the combination comprising:

a rivet having an axially elongated sleeve portion and an enlarged head portion adjacent one axial end of said sleeve portion;

an open ended bore extending within said rivet coaxially through said head and sleeve portions;

a rivet setting member adapted to be received within said bore;

said setting member including an axially elongated shank portion adapted to extend within said bore and a mandrel adapted to be located axially outward of the axial end of said sleeve portion opposite said one end thereof;

said mandrel including means cooperable with said sleeve portion to deform said sleeve portion upon drawing of said mandrel axially thereinto for setting said rivet;

a drilling cap means adapted to be releasably affixed to said mandrel for rotary driving of said drilling cap by said mandrel; and said drilling cap means including ejection means cooperable with said sleeve portion for ejection of said drilling cap from said mandrel during said drawing of said mandrel axially into said sleeve portion.

2. In a blind setting self-drilling rivet assembly including a hollow open ended rivet sleeve and a setting mandrel adapted for movement into the hollow interior of said sleeve from the open end thereof to deform said sleeve for setting of said rivet, the improvement comprising:

drilling cap means formed to be releasably carried by said mandrel for rotary driving thereof by axial rotation of said mandrel and said drilling cap including means cooperable with said open end of said sleeve to eject said drilling cap from said mandrel coincidentally with said deforming of said sleeve during setting of said rivet.

3. The improvement as claimed in claim 2 wherein said mandrel includes formed means cooperable with said drilling cap to provide a rotary driving connection for imparting rotary torque to said drilling cap.

4. The improvement as claimed in claim 3 wherein said formed means includes a plurality of axially extending grooves formed on the exterior periphery of said mandrel.

5. The improvement as claimed in claim 4 wherein said drilling cap includes a plurality of axially extending ridges, which are engageable in said plurality of grooves to provide said rotary driving connection between said drilling cap and said mandrel.

6. The improvement as claimed in claim 5 wherein said deforming of said sleeve is radial expansion of said sleeve.

7. A self-drilling blind rivet comprising:
an axially elongated sleeve portion;
an enlarged head portion adjacent one axial end of said sleeve portion and integral therewith;
an open ended bore extending coaxially within said rivet through said head and sleeve portions;
a rivet setting member adapted to be received within said bore;
said setting member including a mandrel portion adapted to be maintained in a position axially outward of the axial end of said sleeve portion opposite said one axial end thereof;
said mandrel portion including forming means which is cooperable with said sleeve portion to deform said sleeve portion by moving said mandrel axially into said bore from said opposite axial end of said sleeve portion to set said rivet;
drilling cap means adapted to be releasably carried by said mandrel portion and to be driven in rotation by rotation of said mandrel to drill a hole to receive said rivet; and
said drilling cap including means cooperable with said opposite axial end of said sleeve portion to eject said drilling cap from said mandrel portion during said moving of said mandrel axially into said bore to set said rivet.

* * * * *